Patented Nov. 28, 1922.

1,437,162

UNITED STATES PATENT OFFICE.

LEE LEN THUEY, OF INDIANAPOLIS, INDIANA.

FROZEN CONFECTION AND PROCESS OF MAKING SAME.

No Drawing. Application filed October 12, 1920, Serial No. 417,757. Renewed August 5, 1922. Serial No. 579,948.

*To all whom it may concern:*

Be it known that I, LEE LEN THUEY, a citizen of the United States and a resident of Indianapolis, county of Marion, and State of Indiana, have invented a certain new and useful Frozen Confection and Process of Making Same; and I do hereby declare that the following is a full, clear, and exact description thereof, reference being had to the accompanying drawings, in which like numerals refer to like parts.

This invention relates to a frozen confection and the process of forming the same, said confection resembling ice cream in its consistency and palatable qualities.

The chief object of this invention is to produce in a simple and efficient, as well as an economical manner, a frozen confection which will resemble ice cream in many of its properties, and yet be produced in a novel manner and by novel means.

The chief feature of the invention consists in associating an extract of soy beans, powdered gypsum, or sulphite of lime, a flavoring extract and a sweetening extract.

In the invention 1½ pounds of the ordinary soy beans are soaked in water for approximately ten hours. The beans after soaking are mashed and ground between two flat stones, or are ground in any other suitable manner, water, however, being added to the mixture as the beans are ground and the mashing is continued. This operation is continued until a cream-like pulp is produced from the soy beans. To this cream pulp is added about 3 pints of water to thin the same, and the same is heated until the mixture comes to a boil. The mixture is then strained, preferably through cheese cloth.

To approximately 1 gallon of the soy bean extract prepared as hereinbefore described, there is added suitable calcium sulphur compound, preferably that known as the sulphite of lime or the Chinese gypsum. The sulphite of lime preferably is mixed with a little water and beaten into a paste, and after being thoroughly mixed with said water, said sulphite of lime is immersed in the soy extract while the same is hot. The amount of lime used is from 1 to 2 teaspoonfuls, and said lime serves to preserve the confection, as well as assist in the formation of its cream-like consistency. To properly prepare the confection it has been found necessary to aerate the same, and this is done by removing from the mass of extract a portion thereof and then throwing or pouring said removed portion back into the main portion of said extract, which operation is repeated three or four times. After aerating the extract which has been treated with the sulphite of lime, a sweetening agent is added, such as sugar. To the before mentioned gallon mixture approximately 1½ to 2 pounds of sugar is added. Usually a flavoring extract, such as vanilla or the like is added, the amount and kind thereof being determined by the taste of the maker. The whole mixture is constantly and thoroughly stirred, and after cooling, is placed in the usual ice cream freezer and frozen in much the same manner.

The invention claimed is:

1. The process of forming a milkless frozen confection consisting of adding to an extract of soy beans a quantity of a suitable calcium sulphur compound, aerating the mixture, adding suitable sweetening and flavoring material to suit the taste, and freezing the mixture.

2. A milkless frozen confection including an extract of soy beans and Chinese gypsum.

In witness whereof, I have hereunto affixed my signature.

LEE LEN THUEY.